United States Patent [19]

Malloy Desormeaux

[11] Patent Number: 4,714,335
[45] Date of Patent: Dec. 22, 1987

[54] CAMERA WITH DOOR RELEASE AND FILM REWIND INTERLOCK

[75] Inventor: Stephen G. Malloy Desormeaux, Rochester, N.Y.

[73] Assignee: Eastman Kodak Company, Rochester, N.Y.

[21] Appl. No.: 881,307

[22] Filed: Jul. 2, 1986

[51] Int. Cl.$^4$ .......................... G03B 1/00; G03B 17/02
[52] U.S. Cl. ..................................... 354/214; 354/288
[58] Field of Search ..................... 354/173.1, 214, 288, 354/212; 242/71.6

[56] References Cited

U.S. PATENT DOCUMENTS

| | | | |
|---|---|---|---|
| 380,738 | 4/1888 | Bachman . | |
| 2,765,648 | 3/1953 | Hatcher | 70/264 |
| 3,096,699 | 1/1962 | Harvey et al. | 354/212 |
| 3,423,041 | 1/1969 | Steisslinger et al. | 242/71.6 |
| 3,511,154 | 5/1970 | Simon | 354/214 |
| 4,149,793 | 4/1979 | Date | 354/214 |
| 4,469,421 | 9/1984 | Kamata | 354/212 |

Primary Examiner—A. A. Mathews
Attorney, Agent, or Firm—Roger A. Fields

[57] ABSTRACT

A film rewind button and a door release button are located on the body of a camera. The rewind button is manually movable from an original position to a rewind position to initiate automatic rewinding of an exposed filmstrip back into a light-tight cartridge in the camera. The release button is manually movable from a latch position for securing a rear door of the camera closed to a release position for releasing the door to permit it to be opened in order to remove the cartridge from the camera. As a safeguard against the door being mistakenly opened before rewinding of an exposed filmstrip is initiated, there is provided protective means for preventing the release button from being manually moved from its latch position to its release position unless the rewind button is first manually moved from its release position to its rewind position.

8 Claims, 6 Drawing Figures

CAMERA WITH DOOR RELEASE AND FILM REWIND INTERLOCK

BACKGROUND OF THE INVENTION

The invention relates generally to the field of photographic cameras and in particular to those cameras in which an exposed film strip must be rewound into a light-tight cartridge before a rear door of the camera is opened to remove the cartridge from the camera. More specifically, the invention relates to protective means which safeguards against opening the rear door prematurely.

DESCRIPTION OF PRIOR ART

Typically in a number of recently introduced 35 mm cameras, there is included a motorized film transport mechanism. In operation, a leading end portion of the filmstrip extending from a light-tight cartridge loaded in the camera is automatically attached to a take-up spool. The take-up spool is rotated after each exposure is completed to advance successive frames of the filmstrip from the cartridge across the focal plane of a taking lens and onto the take-up spool. Each time the take-up spool is rotated, an unexposed frame on the filmstrip is located in the focal plane of the taking lens and an exposed frame is wound onto the take-up spool. When the fresh film supply has been exhausted, a trailing end portion of the filmstrip remains attached to a supply spool inside the cartridge. This end of film condition is signalled by a sudden increase in the film tension and in the motor current as the take-up spool attempts to withdraw the remainder of the filmstrip from the cartridge. A tension sensing mechanism responds to the increase in film tension, or a detecting circuit responds to the increase in motor current, by reversing the motor drive to rotate the supply spool inside the cartridge. The rotated spool draws the exposed filmstrip off the take-up spool and rewinds it into the cartridge. Then, a rear door of the camera is opened and the cartridge is removed in order to process the filmstrip.

In other motorized cameras, the end of film condition does not automatically trigger rewinding of the exposed filmstrip into the cartridge. Instead, a warning signal may be provided when, for example, the end of film condition is determined by the sudden increase in the film tension or in the motor current as the take-up spool attempts to withdraw the trailing film end from the cartridge. The warning signal instructs the photographer to activate a film rewind button on the body of the camera to reverse the motor drive to rewind the exposed filmstrip into the cartridge.

The seeming advantage of those cameras in which film rewinding is manually initiated, as compared to those cameras in which film rewinding is automatically initiated, is that the non-automatic cameras are less expensive to manufacture and are less susceptible to failure because of their relative simplicity. However, a disadvantage of the non-automatic cameras is that the photographer may mistakenly actuate a door release button on the body of the camera, rather than actuating the film rewind button, when the warning signal indicating the end of film condition is produced. Thus, the rear door of the camera will be opened prematurely, with the result that at least a portion of the exposed filmstrip is ruined.

SUMMARY OF THE INVENTION

The invention improves photographic cameras of the type wherein (a) a film rewind button is manually movable from an original position to a rewind position to initiate rewinding of an exposed filmstrip back into a light-tight cartridge in the camera and (b) a release button is manually movable from a latch position for securing a rear door of the camera closed to a release position for releasing the door to permit the door to be opened in order to remove the cartridge from the camera. Specifically, the invention provides protective means for preventing the release button from being manually moved from its latch position to its release position unless the rewind button is first manually moved from its original position towards its rewind position. As a result, the rear door is safeguarded against being mistakenly opened before rewinding of an exposed filmstrip is initiated.

DESCRIPTION OF THE PREFERRED EMBODIMENT

Figure 1:
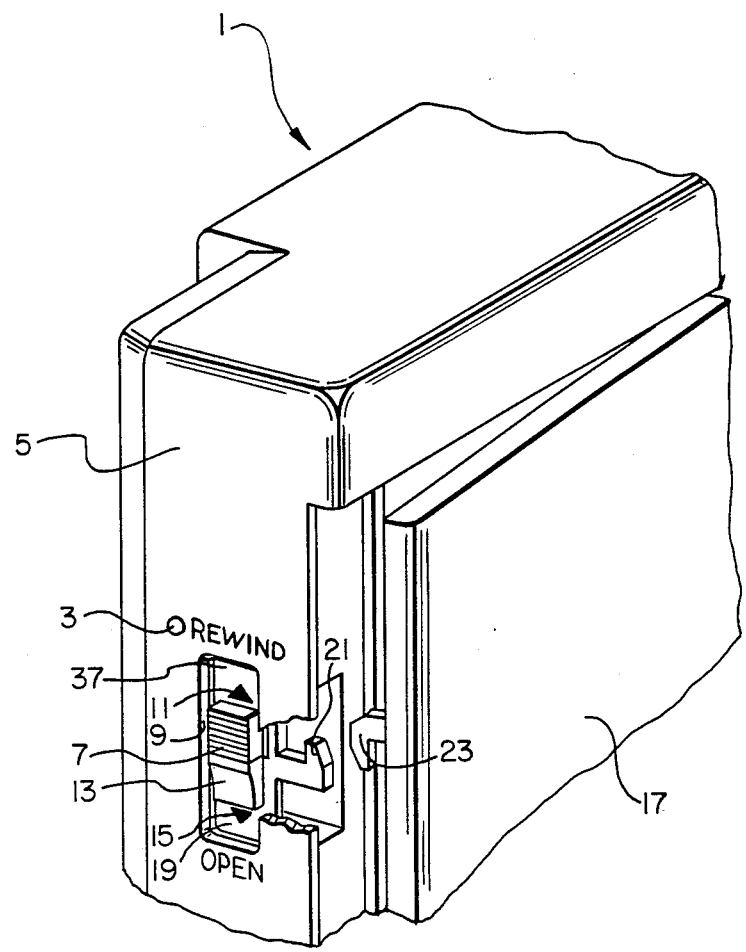
FIG. 1 is a rear perspective view of a body portion of a 35 mm camera, showing a film rewind button which is manually movable from the illustrated original position to a rewind position to initiate automatic rewinding of an exposed filmstrip back into a light-tight cartridge in the camera, and a release button which is manually movable from the illustrated latch position for securing a rear door of the camera closed to a release position for releasing the door to permit it to be opened.

The invention is disclosed as being embodied preferably in a 35 mm camera. Because the features of this type of camera are well known, the description which follows is directed in particular to photographic elements forming part of or cooperating directly with the disclosed embodiment. It is understood, however, that the other elements not specifically shown or described may take various forms known to persons of ordinary skill in the art.

In the type of camera to be described those photographic element shown in the drawings will be assigned successive reference numbers. Other photographic elements not shown in the drawings are well known or conventional and will not be assigned any reference numbers. Thus, in the description which follows, the absence of a reference number in connection with a mentioned element indicates that such element is not shown in the drawings and is conventional or well known.

Referring now to the drawings and in particular to FIG. 1, there is shown a body portion 1 of a 35 mm camera which has a motorized film transport. In operation, a leading end portion of the filmstrip extending from a light-tight cartridge loaded in the camera body 1 is automatically attached to a take-up spool. The take-up spool is rotated after each exposure is completed to advance successive frames of the filmstrip from the cartridge across the focal plane of a taking lens and onto the take-up spool. Each time the take-up spool is rotated, an unexposed frame on the filmstrip is located in the focal plane of the taking lens and an exposed frame is wound onto the take-up spool. When the fresh film supply has been exhausted, a trailing end portion of the filmstrip remains attached to a supply spool inside the cartridge. This end of film condition is signalled by a sudden increase in the film tension as the take-up spool attempts to withdraw the remainder of the filmstrip from the cartridge. A tension sensing device responds to the increase in film tension to de-energize the motor drive and to produce a visible warning signal, for example, by energizing a light-emitting diode (LED) 3 on a side wall 5 of the camera body 1. The LED 3, when energized, alerts the photographer of the end of film condition. If, then, the photographer actuates a film rewind button 7 located within an elongate opening 9 in the side wall 5, in the direction indicated by the arrowhead 11, the motor drive will be re-energized with a reversed polarity to rotate the supply spool inside the cartridge to rewind the exposed filmstrip back into the cartridge. When the filmstrip is rewound completely into the cartridge, the motor drive and the LED 3 are de-energized. Alternatively, the LED 3 may be previously de-energized in response to actuation of the rewind button 7. Once film rewinding is completed, a door release button 13 located within the elongate opening 9 is manually actuated in the direction indicated by the arrowhead 15 to unlatch a rear door 17 pivotally mounted on the camera body 1. Then, the rear door 17 is opened and the cartridge may be removed from the camera body 1.

Figure 2:
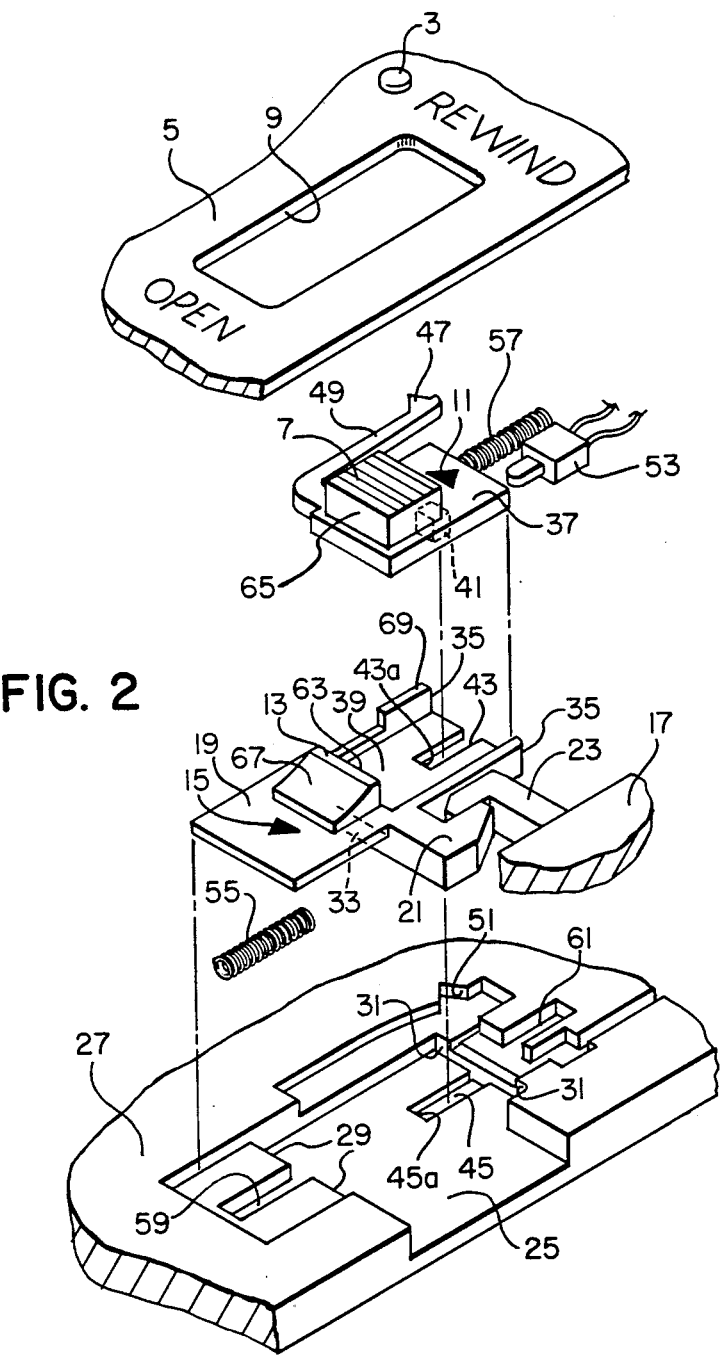
FIG. 2 is an exploded perspective view of protective means according to a preferred embodiment of the invention for preventing the release button from being manually moved to its release position before the rewind button is manually moved to its rewind position.
Figure 3:
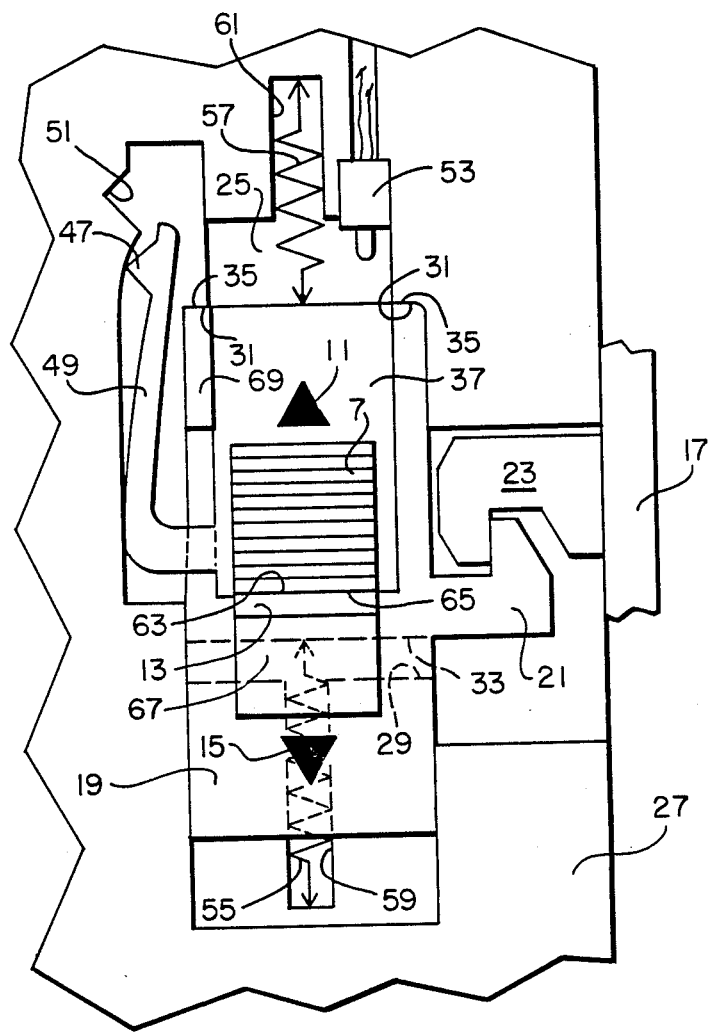
FIGS. 3, 4 and 5 are plan views of the protective means, serially depicting the sequence of operation of such means.
Figure 4:
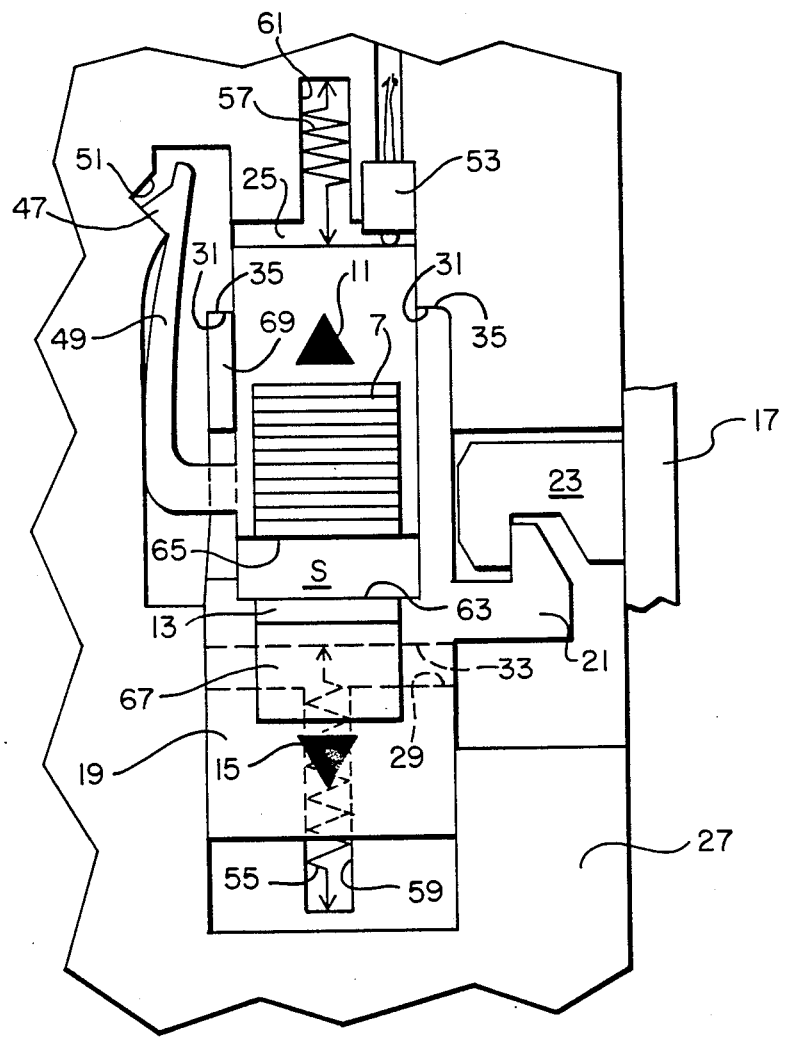
Figure 5:
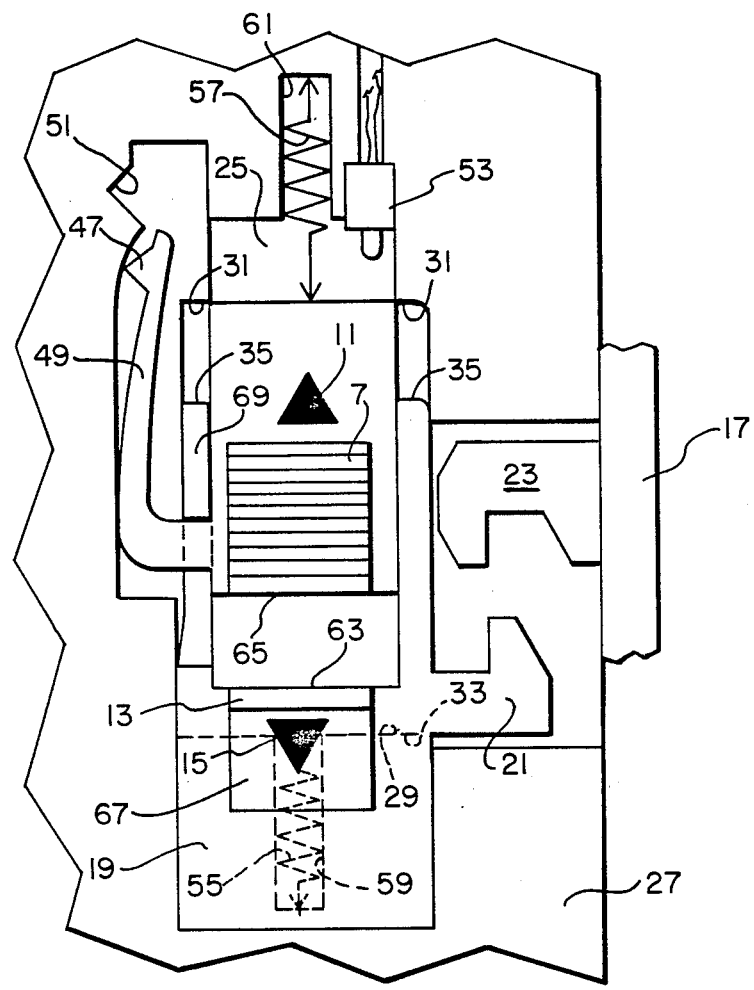

FIG. 2 depicts protective means for preventing the release button 13 from being mistakenly actuated to open the rear door 17 before the rewind button 7 is actuated to initiate film rewinding. Specifically, the release button 13 is integrally formed as part of a release member 19 which includes a latching element 21 for engaging a corresponding element 23 of the rear door 17 to secure the door closed. The release member 19 is slidably movable within a longitudinal nest 25 in a subplate 27 fixed to the camera body 1. In essence, the release member 19 can be manually moved in the direction indicated by its arrowhead 15 from a latching position in which the latching element 21 and the corresponding element 23 are engaged to secure the rear door 17 closed, as shown in FIGS. 1-3, to a release or open position in which the latching element is separated from the corresponding element to allow the rear door to be pivoted open, as shown in FIG. 5. The longitudinal nest 25 is limited lengthwise by upstanding surfaces 29 and 31 of the subplate 27 which serve as opposite stops for respective edges 33 and 35 of the release member 19. As shown in FIG. 4, the edge 35 abuts the surface 31 when the release member 19 is in its latch position and, as shown in FIG. 5, the edge 33 abuts the surface 29 when the release member is in its release position.

The rewind button 7 is integrally formed as part of a rewind member 37 which is slidably movable within a longitudinal nest 39 in the release member 19. A post 41 fixed to the rewind member 37 extends crosswire through a slot 43 in the nest 39 of the release member 19 and into a slot 45 in the nest 25 of the subplate 27 to guide the rewind member during its sliding movement.

Normally, the post 41 is disposed in abutment against closed ends 43a and 45a of respective slots 43 and 45. See FIG. 2. The rewind member 37 can be manually moved in the direction indicated by its arrowhead 11 from an original idle position in which a pawl 47 on the end of a resiliently flexible finger 49 fixed to the rewind member is spaced from a notch 51 in the subplate 27, as shown in FIG. 3, to a rewind position in which the pawl is received in the notch to releasably retain the rewind member in the rewind position, as shown in FIG. 4. In the rewind position, the rewind member 37 closes a normally open switch 53 to initiate rewinding of the exposed filmstrip back into the cartridge.

A pair of helical tension springs 55 and 57 extending from respective channels 59 and 61 in the subplate 27 urge the release member 19 and the rewind member 37 to their latch and original positions, as shown in FIGS. 2 and 3. When the release member 19 is in its latch position and the rewind member 37 is in its original position, respective upstanding surfaces 63 and 65 of the release and rewind buttons 7 and 13 are located substantially adjacent (or abutting) one another. As long as the upstanding surface 63 of the release button 7 is not physically exposed because such surface is located adjacent (or abutting) the upstanding surface 65, it is difficult to manually grip the release button to move the button in the direction indicated by its arrowhead 15 out of its latch position. This is due to the sloping configuration of the main surface 67 of the release button 13. When the rewind member 37 is moved in the direction indicated by its arrowhead 11 from its original position to its rewind position, as shown in FIG. 4, the upstanding surface 65 of the rewind button 7 is separated from the upstanding surface 63 of the release button 13, creating a space S between the two surfaces. This allows the release button 13 to be readily gripped to move the release button in the direction indicated by its arrowhead 15 to its release position, as shown in FIG. 5. Thus, the release member 19 is presented from being moved to its release position unless the rewind member 37 is first moved to its rewind position.

In actual operation, of course, the photographer would not move the release member 19 to its release position until film rewinding is completed. As described above, the completion of film winding is indicated by de-energization of the LED 3, as well as by de-energization of the motor drive.

One-way (unidirectional) coupling means is provided for coupling the rewind member 37 and the release member 19 to cause the rewind member to be moved by the release member from its rewind position towards its original position as the release emmber is moved from its latch position to its release position, but for allowing the rewind member to be moved from its original position to its rewind position without causing any movement of the release member out of its latch position. Specifically, as shown in FIGS. 2 and 3, the finger 49 fixed to the rewind member 37 extends across the path of movement of a projection 69 on the release member 19. When the release member 19 is moved in the direction indicated by its arrowhead 15 to its release position, as shown in FIG. 5, the projection 69 pushes the finger 49 to disengage the pawl 47 on the finger from the notch 51 in the subplate 27 and to return the rewind member 37 to its original position. Conversely, when the rewind member 37 is moved in the direction indicated by its arrowhead 11 to its rewind position, as shown in FIG. 4, the projection 69 does not obstruct corresponding movement of the finger 49 to locate the pawl 47 in the notch 51.

Figure 6:
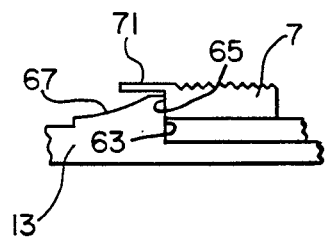
FIG. 6 is an elevation view of the protective means according to an alternate embodiment of the invention.

The rewind button 7 may include a shield-like extension 71 which, as shown in FIG. 6, at least partially covers the sloped surface 67 of the release button 13 when the release member 19 is in its latch position and the rewind member 37 is in its original position. The shield 71 further blocks any attempt to manually grip the release button 13 to move the release member 19 out of its latch position before the rewind member 37 is moved to its rewind position. However, when the rewind member 37 is in its rewind position, the shield 71 completely uncovers the release button 13 to allow the button to be manually gripped to move the release member 19 out of its latch position.

The invention has been described with reference to preferred and alternate embodiments. However, it will be appreciated that modifications and variations can be effected within the ordinary skill in the art without departing from the scope of the invention. For example, the rewind member 37 and the release member 19 may be physically interlocked in a way that prevents the release member from being moved out of its latch position unless the rewind member is first moved to its rewind position. According to another example, the LED 3 may be concealed beneath the rewind member 37 when such member is in its original position. The LED 3 would only be revealed when the rewind member 37 is moved to its rewind position.

The one-way (unidirectional) coupling means, described above, may be modified by locating the notch 51 in the rear door 17, rather than in the subplate 17. In this instance, the projection 69 on the release member 19 can be eliminated. Instead, when the release member 19 is moved from its latch position to its release position, an opening spring would pivot the rear door 17 open, thereby removing the notch 51 from engagement with the pawl 47 on the finger 49 to allow the compression spring 57 to return the rewind member 37 to its original position.

We claim:

1. An improved photographic camera of the type wherein (a) a rewind member is manually movable from an original position to a rewind position to initiate automatic rewinding of an exposed filmstrip back into a light-tight cartridge in said camera and (b) a release member is manually movable from a latch position for securing a rear door of said camera closed to a release position for releasing said door to permit the door to be opened in order to remove the cartridge from said camera, and wherein the improvement comprises:
   means for supporting said rewind member and said release member substantially adjacent each other when the rewind member is in its original position and the release member is in its latch position and for supporting said rewind member and said release member spaced from each other when the rewind member is in its rewind position and the release member is in its latch position; and
   means for preventing said release member from being manually moved to its release position when said rewind member and the release member are adjacent each other and for allowing said release member to be manually moved to its release position when said rewind member and the release member are spaced from each other, whereby said rear door is safeguarded against being opened before automatic rewinding of an exposed filmstrip is initiated.

2. The improvement as recited in claim 1, wherein said preventing means includes respective surfaces on said rewind member and on said release member which are correspondingly arranged for preventing the release member substantially from being gripped when the two members are adjacent each other, to prevent said release member from being manually moved out of its latch position, and for allowing the release member to be gripped when the two members are spaced from each other, to enable the release member to be manually moved out of its latch position.

3. The improvement as recited in claim 2, wherein said surface on said rewind member at least partially covers said surface on said release member when the two members are adjacent each other and uncovers the surface on the release member when the two members are spaced from each other.

4. An improved photographic camera of the type wherein (a) a rewind member is manually movable from an original position to a rewind position to initiate automatic rewinding of an exposed filmstrip back into a light-tight cartridge in said camera and (b) a release member is manually movable from a latch position for securing a rear door of said camera closed to a release position for releasing said door to permit the door to be opened in order to remove the cartridge from said camera, and wherein the improvement comprises:
   one-way actuating means for actuating said rewind member to cause the rewind member to be moved from its rewind position towards its original position when said release member is manually moved from its latch position to its release position, but allowing said rewind member to be manually moved from its original position to its rewind position without causing any related movement of said release member out of its latch position; and
   means for preventing said release member from being manually moved from its latch position to its release position unless said rewind member is first manually moved from its original position towards its rewind position, whereby said rear door is safeguarded against being opened before automatic rewinding of an exposed filmstrip is initiated.

5. An improved photographic camera of the type wherein (a) a rewind member is manually movable from an original position to a rewind position to initiate automatic rewinding of an exposed filmstrip back into a light-tight cartridge in said camera and (b) a release member is manually movable from a latch position for securing a rear door of said camera closed to a release position for releasing said door to permit the door to be opened in order to remove the cartridge from said camera, and wherein the improvement comprises:
   means for supporting said rewind member and said release member for movement in opposite directions from their original and latch positions to their rewind and release positions and in reverse directions to return to their original and latch positions, respectively;
   unidirectional coupling means for coupling said rewind member and said release member to cause said rewind member to be moved by said release member from its rewind position towards its original position as the release member is manually moved from its latch position to its release position, but allowing said rewind member to be manually moved from its original position to its rewind position without causing any movement of said release member out of its latch position; and means for preventing said release member from being manually moved from its latch position to its release position unless said rewind member is first manually moved from its original position towards its rewind position, whereby said rear door is safeguarded against being opened before automatic rewinding of an exposed filmstrip is initiated.

6. The improvement as recited in claim 5, wherein said supporting means supports said rewind member and said release member substantially adjacent each other when the rewind member is in its original position and the release member is in its latch position and supports the two members spaced from each other when said rewind member is in its rewind position and said release member is in its latch position, and said preventing means prevents said release member from being manually moved to its release position when said rewind member and the release member are adjacent each other and allows said release member to be manually moved to its release position when the two members are spaced from each other.

7. The improvement as recited in claim 6, wherein said supporting means and said rewind member include cooperating engageable means for releasably retaining the rewind member in it rewind position, said engagable means releasing said rewind member when said unidirectional coupling means couples the rewind member and said release member and the release member is manually moved from its latch position towards its release position.

8. An improved photographic camera of the type wherein (a) a rewind member is manually movable from an original position to a rewind position to initiate automatic rewinding of an exposed filmstrip back into a light-tight cartridge in said camera and (b) a release member is manually movable from a latch position for securing a rear door of said camera closed to a release position for releasing said door to permit the door to be opened in order to remove the cartridge from said camera, and wherein the improvement comprises:

means for at least partially shielding said release member when said rewind member is in its original position and said release member is in its latch position, to prevent the release member substantially from being manually gripped to move the release member to its release position; and means for supporting said rewind member to remove said shielding means from said release member when said rewind member is manually moved towards its rewind position, to permit said release member to be manually gripped to move the release member to its release position, whereby said rear door is safeguarded against being opened before automatic rewinding of an exposed filmstrip is initiated.

* * * * *